(12) United States Patent
Bykov et al.

(10) Patent No.: US 10,725,819 B2
(45) Date of Patent: Jul. 28, 2020

(54) SYSTEM AND METHOD FOR SCHEDULING AND ALLOCATING DATA STORAGE

(71) Applicant: Acronis International GmbH, Schaffhausen (CH)

(72) Inventors: Sergey Bykov, Moscow (RU); Eugene Aseev, Moscow (RU); Sanjeev Solanki, Singapore (SG); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 118 days.

(21) Appl. No.: 15/983,245

(22) Filed: May 18, 2018

(65) Prior Publication Data
US 2019/0354399 A1    Nov. 21, 2019

(51) Int. Cl.
| | |
|---|---|
| G06F 9/46 | (2006.01) |
| G06F 9/48 | (2006.01) |
| G06F 3/06 | (2006.01) |
| G06Q 10/04 | (2012.01) |
| G06N 20/00 | (2019.01) |
| G06F 16/16 | (2019.01) |

(52) U.S. Cl.
CPC .......... *G06F 9/4881* (2013.01); *G06F 3/0604* (2013.01); *G06F 3/067* (2013.01); *G06F 3/0653* (2013.01); *G06F 16/16* (2019.01); *G06N 20/00* (2019.01); *G06Q 10/04* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 9,043,279 B1 | 5/2015 | Yucel et al. | |
| 9,495,211 B1 | 11/2016 | Helstroom et al. | |
| 2003/0237084 A1* | 12/2003 | Neiman | G06F 9/5038 718/102 |
| 2007/0169125 A1 | 7/2007 | Qin | |

(Continued)

FOREIGN PATENT DOCUMENTS

CN    103561077 A    2/2014

*Primary Examiner* — Gregory A Kessler
(74) *Attorney, Agent, or Firm* — Arent Fox LLP; Michael Fainberg

(57) ABSTRACT

A system and method is disclosed for scheduling and allocating data storage. An example method comprises generating a scheduling problem based at least on states of each of the plurality of storage nodes, a received plurality of storage tasks and received constraints, wherein the scheduling problem is a constraint satisfaction problem, selecting one or more approaches to solving the scheduling problem based on metadata associated with the storage tasks and constraints, solving the scheduling problem to generate a scheduling solution based on the one or more approaches, determining whether the given constraints are satisfied by the scheduling solution, executing, by the processor, the scheduling solution by assigning storage of data to each of the plurality of storage nodes when the constraints are satisfied by the scheduling solution and determining another scheduling solution based on the one or more approaches when the constraints are not satisfied by the scheduling solution.

18 Claims, 8 Drawing Sheets

(56) References Cited

U.S. PATENT DOCUMENTS

| | | | |
|---|---|---|---|
| 2010/0257015 A1* | 10/2010 | Molander | G06Q 10/06 705/7.21 |
| 2013/0067187 A1 | 3/2013 | Moss et al. | |
| 2013/0326527 A1* | 12/2013 | Suzuki | G06F 9/4881 718/102 |
| 2014/0007135 A1 | 1/2014 | Yamauchi et al. | |
| 2014/0025822 A1* | 1/2014 | Guha | G06F 9/5038 709/226 |
| 2016/0364269 A1 | 12/2016 | Wang | |
| 2017/0177255 A1 | 6/2017 | Xie | |
| 2018/0091850 A1* | 3/2018 | Sandholm | H04N 21/262 |

\* cited by examiner

SYSTEM AND METHOD FOR SCHEDULING AND ALLOCATING DATA STORAGE

FIELD OF TECHNOLOGY

The present disclosure generally relates to the field of electronic data storage, and, more specifically, to systems and methods for scheduling and allocating data storage.

BACKGROUND

A storage service provider owns a set of servers to store and manage user data in a storage system. In most cases, the set of servers tend to be overprovisioned. The service providers allocate significantly more resources then are really needed to serve a given workload. FIG. 2 shows an example of such overprovisioning, where a number of jobs 1, 2 and 3 are provisioned over machines M1, M2 and M3. Portions of each job are completed by different machines, or workers (alternatively referred to as nodes). Each job requires a particular amount of effort to complete and each machine has limited performance. As a result, a jobs-to-machine schedule is sometimes created, where the minimal length schedule is referred to as a "makespan". Such behavior of a storage system is generally predefined during software development. In fact, some behavioral aspects of the storage system are enforced directly in source code. When the system is in operation, receiving requests and assigning jobs to workers, the behavior cannot be modified in real-time. Instead, the original source code must be modified and deployed in order to change the operation of the storage system.

Often, developers who develop the software of the storage system and operators of a data center are different individuals with different duties and objectives. Accordingly, having developers involved in constantly changing code based on current states of the system would unnecessarily comingle the duties and requirements of software developers and Data Center operations (DCO) personnel. Conversely, DCOs being involved in software development is also unfeasible. Therefore, the system should be designed in a way as to respond to requests, whether they be storage requests, or otherwise, based on current system status and constraints without the need to redesign the entire system.

SUMMARY

Thus, the present disclosure provides an effective solution for the foregoing problems by smart scheduling to optimize file storage in electronic data storage. Disclosed are example systems, methods and computer program products for performing the improved data storage and management techniques described herein.

In one aspect, an exemplary method is disclosed for storing electronic data. According to the aspect, the method includes generating a scheduling problem based at least on states of each of the plurality of storage nodes, a received plurality of storage tasks and received constraints, wherein the scheduling problem is a constraint satisfaction problem, selecting one or more approaches to solving the scheduling problem based on metadata associated with the storage tasks and constraints, solving the scheduling problem to generate a scheduling solution based on the one or more approaches, determining whether the given constraints are satisfied by the scheduling solution, executing, by the processor, the scheduling solution by assigning storage of data to each of the plurality of storage nodes when the constraints are satisfied by the scheduling solution and determining another scheduling solution based on the one or more approaches when the constraints are not satisfied by the scheduling solution.

In one aspect, the method further comprises wherein a solution comprises a suboptimal assignment schedule of task assignments that meet at least a predetermined threshold percentage of the given constraints.

In one aspect of the method, solving the scheduling problem is performed using one or more of an integer programming problem, Boolean satisfiability problem or specific scheduling heuristics.

In one aspect of the method, solving, by the processor, the scheduling problem further comprises optimizing the solution such that the schedule 1) is optimized for a given objective or objectives and 2) satisfies all of the given constraints.

In one aspect of the method the given objectives or objectives include one or more of: minimal power used by a storage node, no nodes were turned on from stand-by mode; and, specific data-durable distribution was used.

In one aspect, the method further comprises determining the states of each of the plurality of storage nodes by determining which of the plurality of storage nodes are currently online, determining storage space available in each of the plurality of storage nodes; and determining a workload of each of the plurality of storage nodes.

In one aspect, the method further comprises inspecting a data size for each of the plurality of storage tasks and determine additional information for each of the plurality of storage tasks.

In one aspect of the method, the metadata associated with the storage tasks and constraints comprise at least one or more of current file location, data size, access and operation (edit, create, scheduled deletion) dates, number of copies, and copy locations.

In one aspect of the method, solving the scheduling problem comprises using machine learning and heuristics to generate the solution.

In one aspect the method further comprises selecting a scheduling solution that is most efficient, comparatively and applying the scheduling solution to the problem by distributing the storage tasks according to the scheduling solution.

In one aspect of the method, the constraints describe prohibited and/or discouraged states of the plurality of storage nodes.

In one aspect of the method, the constraints defines a maximum allowed power, a maximum number of nodes allowed online, or a restriction on which nodes can serve the same request.

In one aspect of the method, chunks belonging to the same data file are stored in different storage nodes.

In one aspect, an exemplary system is disclosed comprising a hardware processor configured to: receive a plurality of storage tasks and constraints, generate, by a processor, a scheduling problem based at least on states of each of the plurality of storage nodes, the plurality of storage tasks and the constraints, wherein the scheduling problem is a constraint satisfaction problem, select one or more approaches to solving the scheduling problem based on metadata associated with the storage tasks and constraints, solve, by the processor, the scheduling problem to generate a scheduling solution based on the one or more approaches, determine whether the given constraints are satisfied by the scheduling solution, executing, by the processor, the scheduling solution by assigning storage of data to each of the plurality of storage nodes when the constraints are satisfied by the scheduling solution and determine another scheduling solution based on the one or more approaches when the constraints are not satisfied by the scheduling solution.

In another aspect, a non-transitory computer readable medium is disclosed with instructions thereon comprising generating a scheduling problem based at least on states of each of the plurality of storage nodes, a received plurality of storage tasks and received constraints, wherein the scheduling problem is a constraint satisfaction problem, selecting one or more approaches to solving the scheduling problem based on metadata associated with the storage tasks and constraints, solving the scheduling problem to generate a scheduling solution based on the one or more approaches, determining whether the given constraints are satisfied by the scheduling solution, executing, by the processor, the scheduling solution by assigning storage of data to each of the plurality of storage nodes when the constraints are satisfied by the scheduling solution and determining another scheduling solution based on the one or more approaches when the constraints are not satisfied by the scheduling solution.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for deploying a distributed computing system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As described herein, a method and system is disclosed for managing aspects of data storage on a file storage system, such as an online/remote file storage service or cloud computing service. Examples of such services include Amazon® Simple Storage Service ("S3"), and Microsoft® Azure ("Azure"). As will be appreciated herein, the method and system provides an efficient mechanism for creating and managing data files, which can allow individuals and organizations to limit, at least to some extent, the increase of data storage costs.

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Each storage provider provides storage services and operates on a set of constraints. In the present disclosure, instead of predefining storage behavior in the algorithms of the storage system, the algorithms take into account the constraints of each individual system. The constraints can then be modified or changed on the fly, in one aspect, and the algorithms to generate the schedule for storage of data adapts accordingly, referred to as a declarative approach to describe the scheduling behavior.

Figure 1:
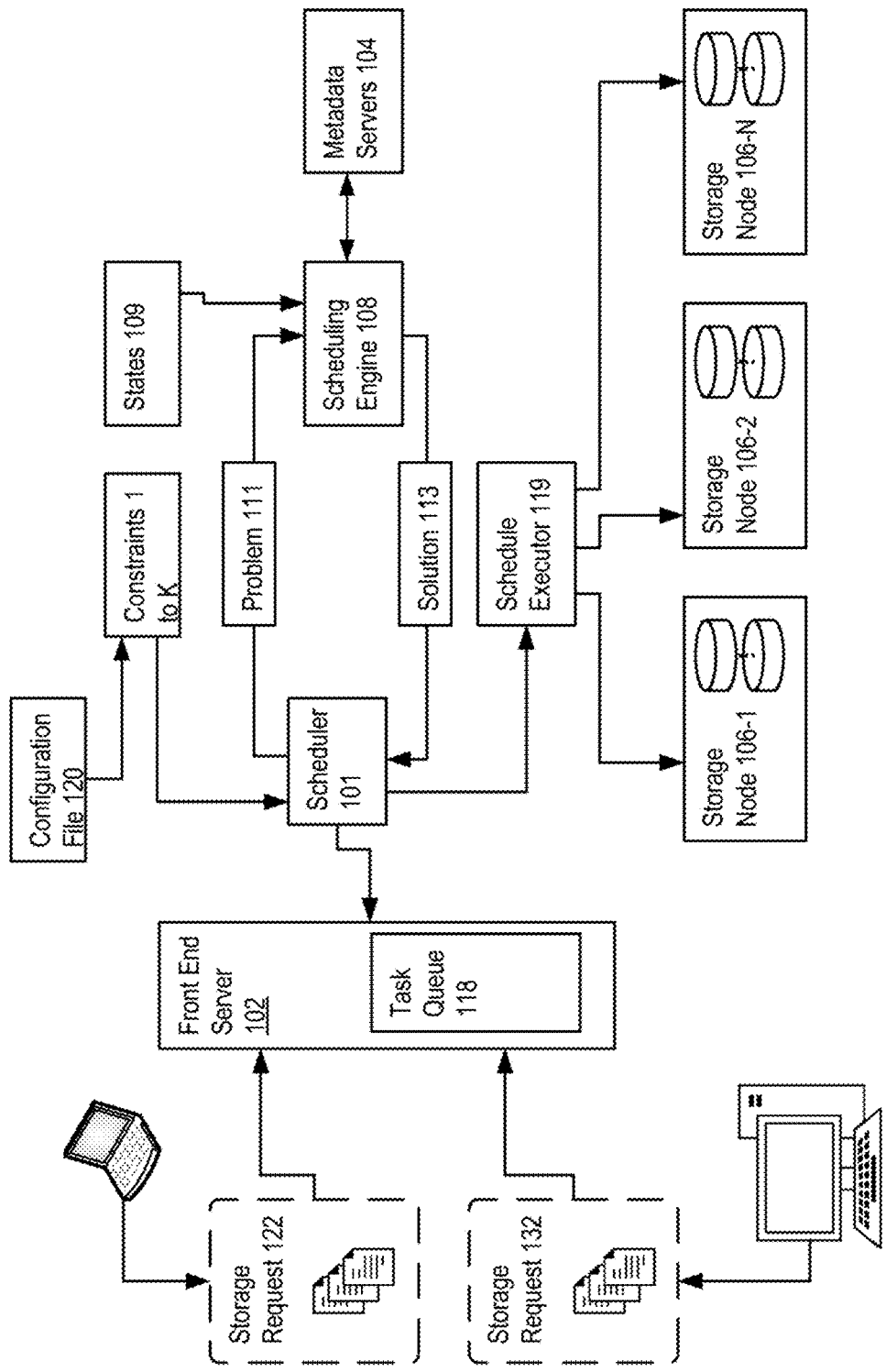
FIG. 1 illustrates a block diagram of a system for scheduling and allocating data storage according to an exemplary aspect of the disclosure.

In order to efficiently use each storage serves, FIG. 1 illustrates a system 100 for scheduling and allocating data storage in accordance with an exemplary aspect of the present disclosure.

The system 100 comprises a scheduler 101, front-end server 102, metadata servers 104, storage nodes 106-1 to 106-N, and a scheduling engine 108. The scheduler 101 gathers data and requests and proposes a problem 111 to distribute the requests among the storage nodes 106-1 to 106-N, based on constraints 1 to K, data from the metadata servers 104 and storage states 109 related to the system 100. In one aspect of the disclosure, the metadata servers provide metadata, the metadata comprising at least one or more of current file location, data size, access and operation (edit, create, scheduled deletion) dates, number of copies, copy locations, and the like. The scheduling engine 108 receives the problem 111 regarding the system 100 to generate a solution 113, which the scheduler 101 implements to distribute requests to each storage node.

In an exemplary aspect, a client 130 issues a storage request 132 to a system 100. The system 100 receives or intercepts the request at the front end server 102 and issues the request 132 to the scheduler 101. In some instances, the storage request 132 may be an internal request for maintenance or data migration, or may be an external request from a customer to store a particular file or files. The front end server 102 breaks up the storage request into multiple storage tasks and places them in task queue 1118. In one aspect, the system 100 may store the data identified by the storage request 132 in various storage nodes 106-1 to 106-N. However, instead of immediately storing portions of the data in each node, or in one node, the scheduler 101 considers constraints 1 to K, which may be specified in a configuration file 120.

The constraints 1 to K represent rules imposed on the system 100 that must generally be obeyed during operation of the system 100 in order to arrive at a particular objective or objectives, or that are used as guidelines in operation of the system 100 according to some aspects to achieve the objective (or arrive proximate the objective). Some exemplary objectives may comprise: minimization of total time required to process a request, minimizing total time required to serve a request, minimizing a number of operations to serve a request, or the like. The constraints 1 to K represent the preferred state for the DCO while attempting to reach the specified objective, and may be modifiable during operation in some aspects. In some aspects, the constraints 1 to K of the system 100 are predefined by an administrator of the system. In other aspects, the constraints 1 to K are predefined, but may be modified as the system is running and the system adapts to the modification in real-time, or after a specified time.

Figure 2:
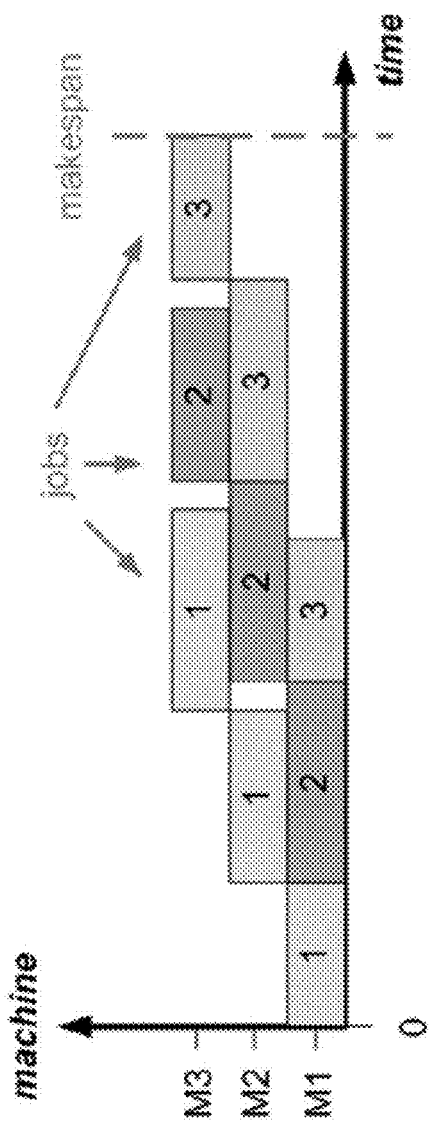
FIG. 2 illustrates job allocation per machine in accordance with exemplary aspects of the present disclosure.

In considering the constraints 1 to K, the scheduler issues a request to a scheduling engine 108 referencing the "scheduling problem", e.g. problem 111. The problem 111 identifies the constraints 1 to K, information regarding the storage node 106-1 to 106-N, the states of the system 100 and the data to be stored, references in the storage request 132. Normally, the data would be divided into a plurality of chunks and each chunk would be stored in one or more of the nodes 106-1 to 106-N in a random fashion, as shown in FIG. 2. However, the problem 111 is presented to the scheduling engine 108 in the present disclosure in order to derive a suboptimal schedule for resource allocation in the system 100. In other words, the problem 111 asks the scheduling engine 108 to form a plan, e.g. solution 113, which outlines an efficient schedule for storing the data identified by storage request 132 across the storage nodes 106-1 to 106-N efficiently and optimally given the constraints 1 to K. The scheduling engine 108 may use, in one aspect, machine learning and heuristics to generate the solution 113. According to one aspect, machine learning is used to analyze previous storage schedules and predict a suboptimal solution 113 based on solutions that were previously proposed and applied to the problem 111. In another aspect, heuristics may comprise one or more rules which indicate what type of solution to select based on the type of constraints and objectives of the system 100. While a solution arrived at via the use of heuristics may be suboptimal, i.e., not perfect, it is sufficient for approaching immediate goals of the system. In some aspects, the solution 113 may trade accuracy for performance (as per a predetermined configuration) because the optimality of the solution cannot be guaranteed. In other words, the solution 113 may be suboptimal in that it may use an excessive amount of time and/or memory resources than desired in a particular usage scenario.

In one example, the storage system 100 may describe constraints on its energy profile in the form of prohibited or discouraged states that the system should prevent from being in. In this example, the storage system may define a configuration file 120 that defines the constraints 1 to K, as discouraging or prohibiting the following states (e.g., imposing the following constraints on the system):

1. Max_allowed_power>30
2. Max_nodes_online>10
3. Nodes {i, j, k} can't serve the same request
4. Node_i (t)—Node_i(t+1)=0

Each line describes a prohibited state of the system. Line 3) may be an example of a constraint to enforce data-durability. Such an approach enables DCO to affect the behavior of system 100 directly. Line 4) may represent a fact that accessing the same storage node several times introduces no additional costs, while accessing random nodes could be expensive. In one aspect, a cost is the physical resource cost of using a particular node for storage, measured in terms of time, storage space, or the like. Cost represents a value of using a particular storage node verses another storage node. All values are determined by current needs and/or experience. In some aspects, the configuration changes according to the systems current load. Such a configuration description allows the scheduling engine 108 to automatically determine a suboptimal schedule at any given moment of time considering the constraints 1 to K. Other constraints may include, in some aspects, that portions or chunks of the same file cannot be stored at the same storage node, occupied space distribution for storage nodes must be fair, or consecutive access to the same node is preferred because it is cheaper than randomly selecting nodes, power, and temperature, minimal and maximal delays. In some aspects, one or more of the constraints may not directly impact the achievement of the particular objective.

Given the above example of constraints defined in the configuration file, the scheduling engine 108 optimizes the solution 113 such that the schedule 1) is optimized for a given objective or objectives and 2) satisfies all given constraints. In other words, the scheduling engine 108 solves the "constraint satisfaction problem" known in literature. For example, the solution 113 defines a schedule in which the following objectives are met:

minimal power is used no workers (e.g., nodes) were turned on from stand-by mode specific data-durable distribution was used, wherein data-durable distribution indicates a distribution of data that ensures long-term data protection such that the data does not suffer from bit-rot, degradation or other corruption; in one aspect, data durability is ensured using data redundancy so that data is never lost or compromised, In one aspect, possible objectives may be "power-aware" as described above. For example, an objective may be minimizing the number of concurrently powered nodes, minimizing the number of powering up events, minimizing idle time of the nodes, or the like.

According to one aspect, the solution 113 defines an assignment of a storage request to a set of workers based on a schedule. In some aspects, the scheduling engine 108 which produces solution 113 may provide solutions for scheduling business meetings, transport schedules (e.g., railways, air flights, and the like), class scheduling, manufacturing efficiency (e.g., determining a most efficient allocation of resources to manufacture an item) and the like. In these cases, the resources may differ from the storage resources, and may be other types of hardware corresponding to the domain of the problem.

According to an exemplary aspect, the scheduler 101 may obtain the current state of system 100 and the task queue 118 from the front end server 102. The task queue 118 contains all storage requests, e.g. including a chunked version of storage request 132. In one aspect, each request corresponds to a single archive that contains a user's data. Subsequently, the archive is separated into one or more chunks. The scheduler 101 also may have one or more adapters to read constraints 1 to K, according to whatever form they may be stored in the system 100. The scheduler 101 generates the scheduling problem 111 based on the constraints 1 to K, the data, and the current system state.

The current system state includes, in some aspects, the states of each of the storage nodes 106-1 to 106-N such as currently running, shut-down, powering-down, spinning-up, idling, or the like.

The scheduling engine 108 solves the constraint satisfaction problem described above and produces a solution 113 which contains a suboptimal assignment. In some aspects, the scheduling problem is solved using an integer programming problem, Boolean satisfiability problem, and/or specific scheduling heuristics. The scheduling engine 108 may determine an approach to obtaining the solution 113 to the scheduling problem based on available tasks and data. In some aspects, if the scheduling problem involves solving problems like "does the current solution have property A?", "is variable A equal to B?", or the like, then the scheduling engine 108 selects Boolean satisfiability as an approach to solve the scheduling problem. In this aspect, the scheduling engine 108 determines whether a portion of the problems that involve Boolean conditions are greater than a predetermined threshold. In other aspects, if the problem 111 consists of determinations such as "if A is less than Y", "if B minus C is greater than Z", or the like, the scheduling engine 108 selects integer programming as the approach to solving the problem 111. In these aspects, data such as detailed logs on how requests are processed, resource consumption at each node, administrator's expectations about data center functioning in general and the like may be used by the scheduling engine 108 to select an approach to solving the problem 111.

The scheduler 101 then executes the schedule/assignment defined in the solution 113 by assigning storage requests from the task queue 118 to each storage node 106-1 to 106-N.

Figure 3:
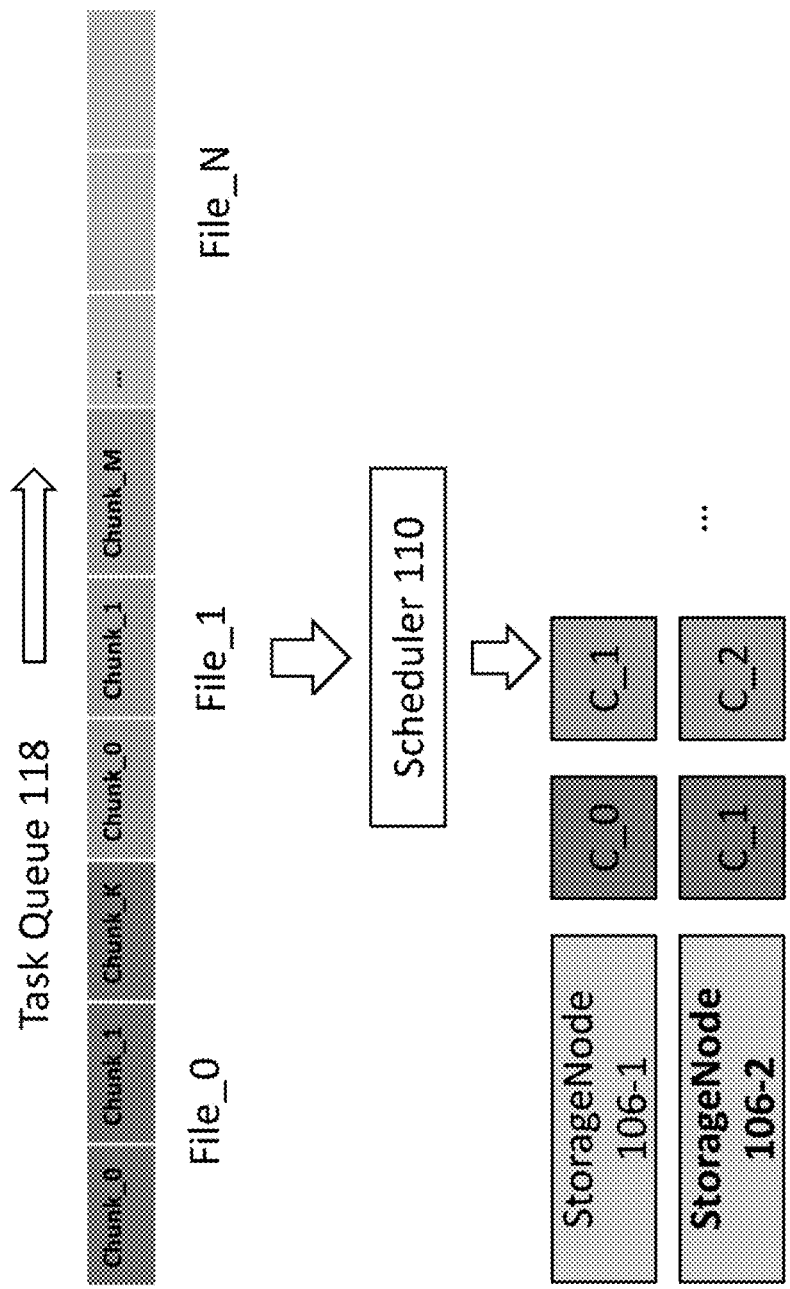
FIG. 3 illustrates an example of a solution implemented by a storage system in accordance with exemplary aspects of the present disclosure.

A high level overview of the scheduler 101 performing the allocation is shown in FIG. 3. FIG. 3 is an exemplary scheduling of the jobs shown in FIG. 2, for example, according to the methods described in the present disclosure. The task queue 118 contains storage requests for files 0 to N, where N is the number of total files requested to be stored. Each chunk shown in the same shade belongs to the same request in the task queue 118. For example, a storage request for "File_0" contains "Chunk_0" to "Chunk_K", while "File_1" contains "Chunk_0" to "Chunk_M".

Each chunk (e.g., "Chunk_0" to "Chunk_K" of "File_0") represents the minimal discrete amount of work to be performed by a worker (e.g., a storage node of the nodes 106-1 to 106-N). The scheduler 101 either is provided the task queue 118 or reads from the task queue 118 and according to results from the scheduling engine, The scheduler 101 assigns each chunk to a storage node considering the constraints 1 to K of system 100. For example, Storage Node 106-1 stores "chunk_0" from "File_0" and then stores "chunk_1" from "File_1". Scheduler 101 also assigns "Chunk_1" from "File_0" and then "Chunk_2" from "File_1" to Storage Node 106-2. Accordingly, the requests from a client to store a particular file or files are allocated to one or more of the storage nodes, optimally using all of the resources of the system 100 based on system constraints and status.

Figure 4:
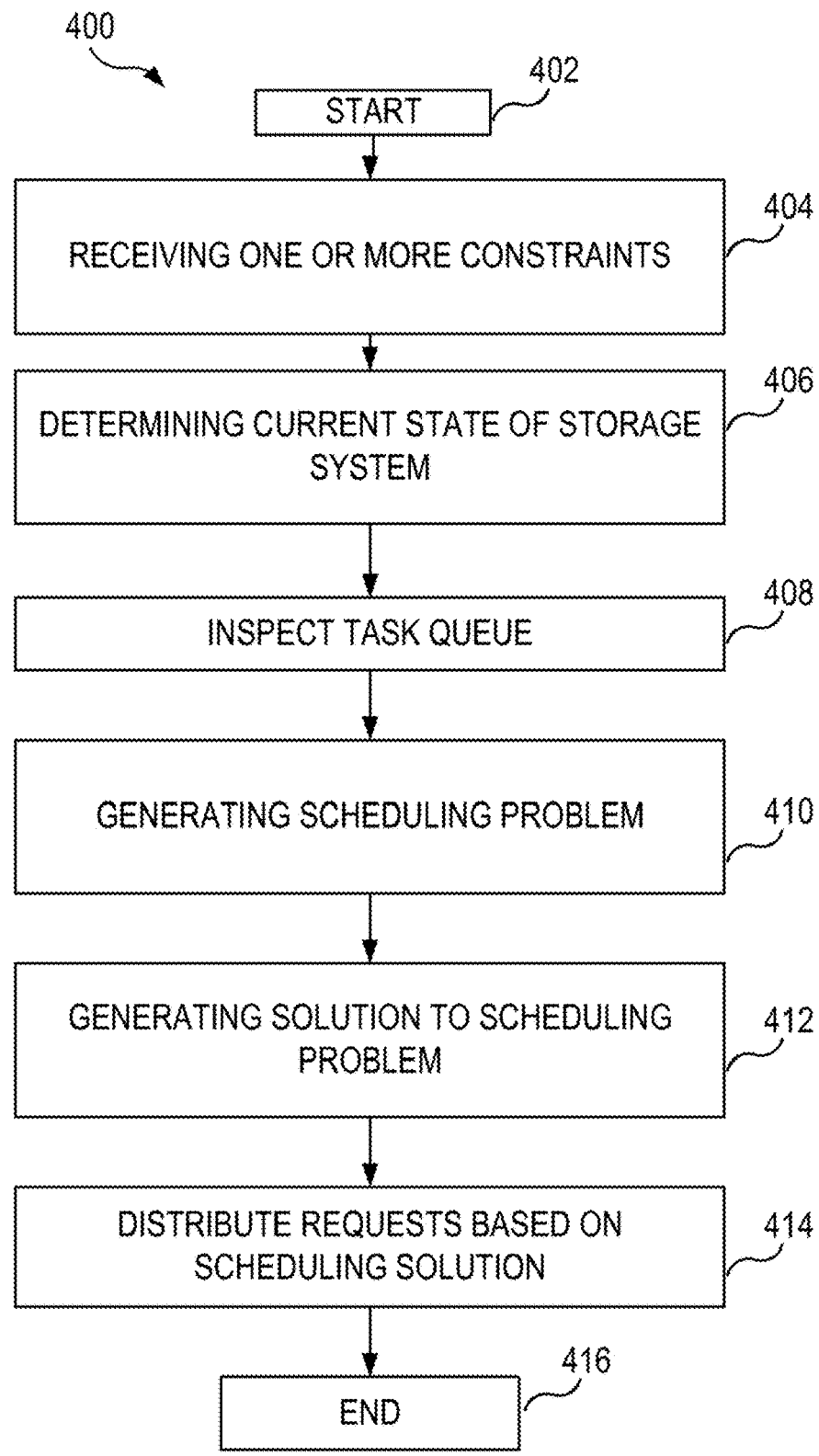
FIG. 4 is a flowchart for a method for scheduling and allocating data storage in accordance with exemplary aspects of the present disclosure.

FIG. 4 is a flowchart for a method 400 for scheduling and allocating data storage in accordance with exemplary aspects of the present disclosure.

Figure 8:
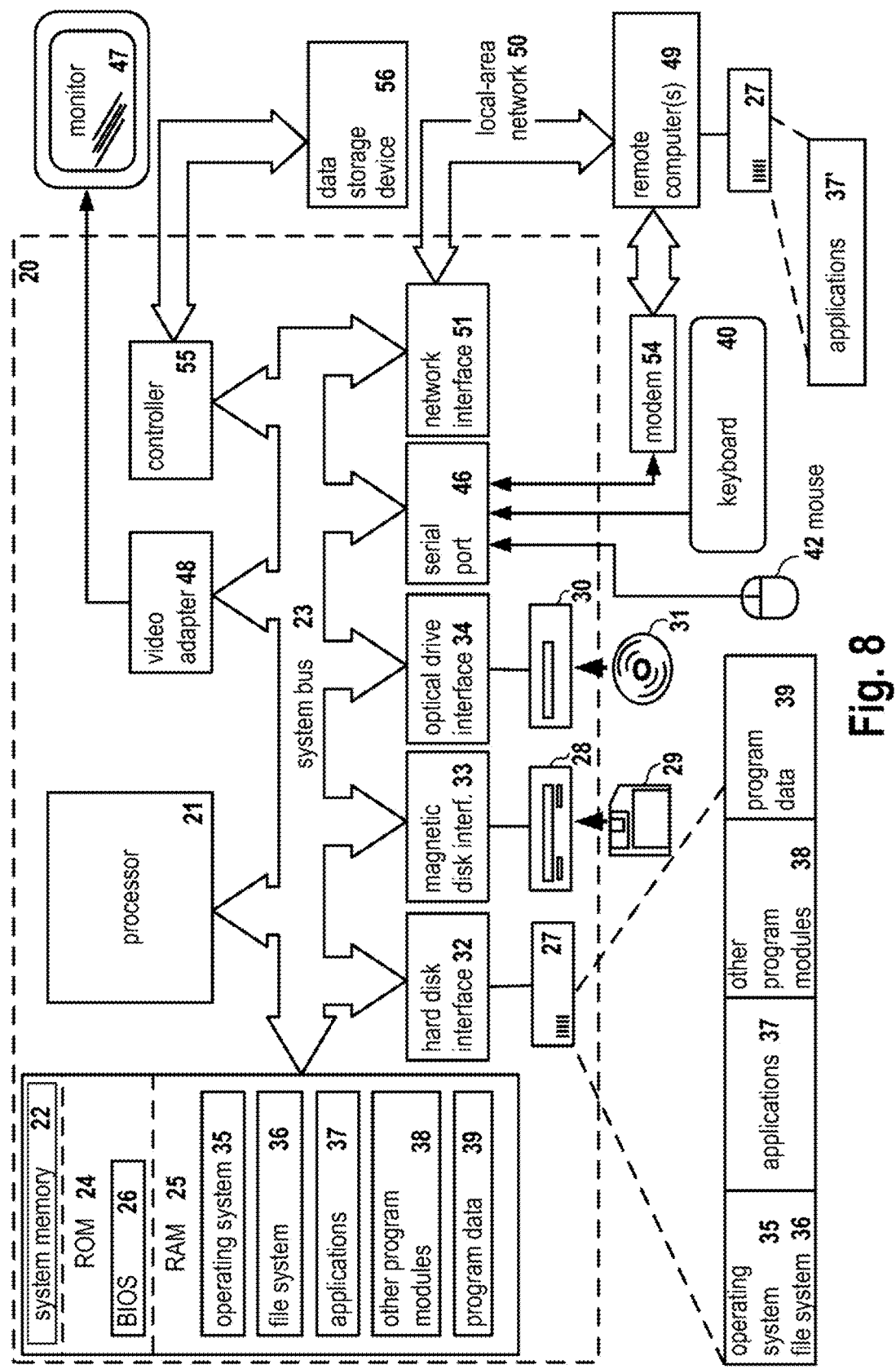
FIG. 8 illustrates an example of a general-purpose computer system on which the disclosed systems and method can be implemented.

The method 400 may be implemented by the scheduler 101 and executed by processor 21 of computer system 20 shown in FIG. 8. The method begins at 402 and proceeds to 404.

At 404 the scheduler 101 receives, observers, or reads one or constraints (e.g., constraints 1 to K of FIG. 1). As disclosed above, the constraints represent constraints on a system such as system 100. The constraints indicate conditions under which a storage system may operate optimally.

At 406, the scheduler 101 determines the current state of the system. For example, several of the storage nodes 106-1 to 106-N may be online or offline, be at maximum capacity in terms of storage, or maximum load in terms of CPU usage. Load information, capacity, offline status, among others, represent the state of each storage node.

After the state of each worker has been determined, the method 400 proceeds to 408, where the scheduler 101 inspects the task queue, e.g. task queue 118 in FIG. 1.

Figure 6:
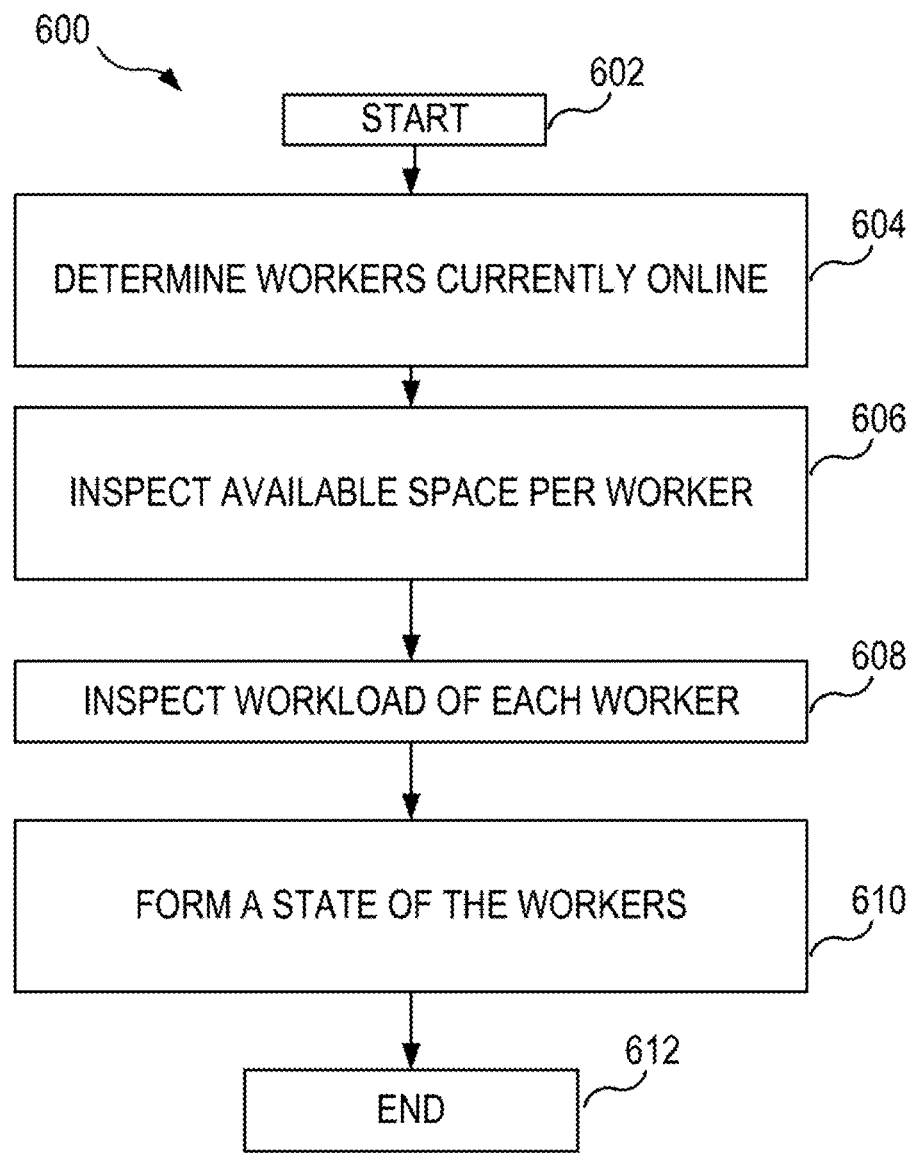
FIG. 6 is a flowchart for a method for determining a current state of a storage system in accordance with exemplary aspects of the present disclosure.
Figure 7:
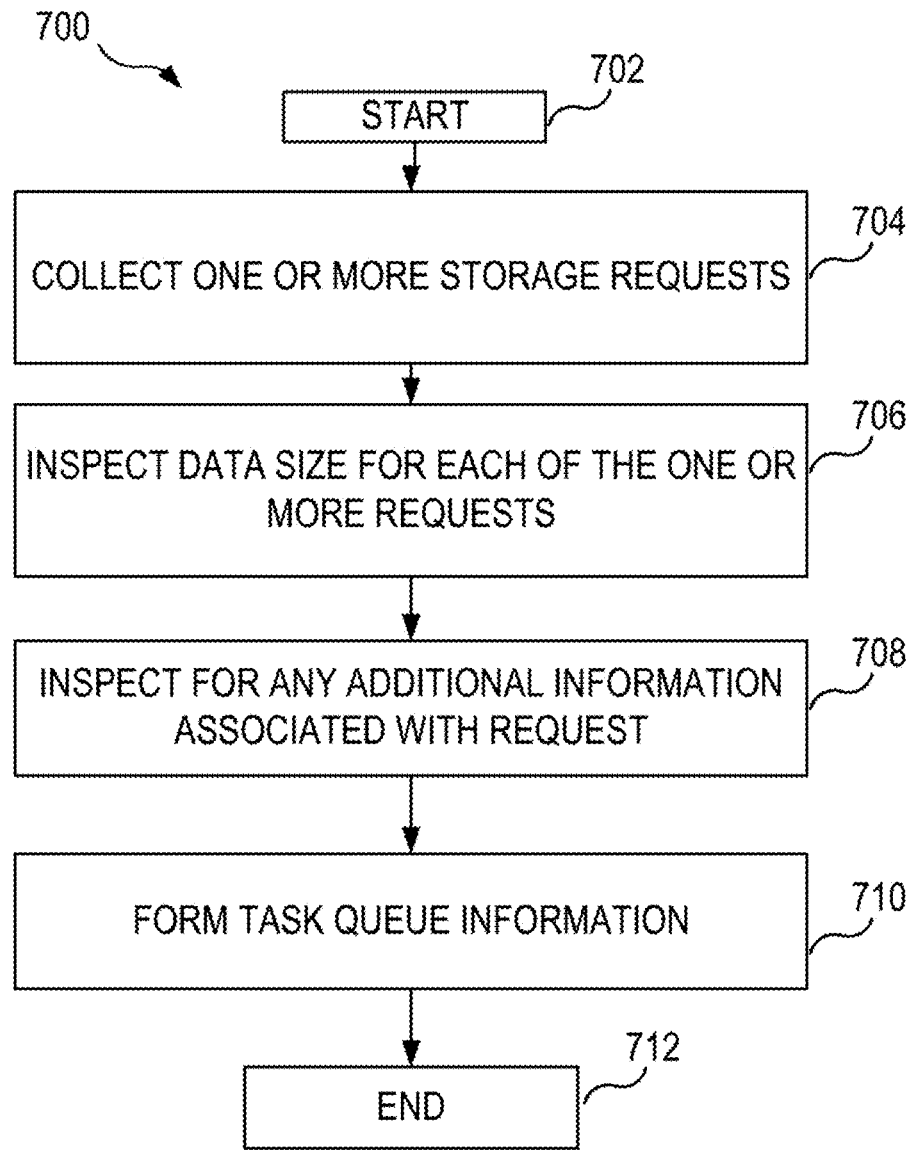
FIG. 7 is a flowchart for a method for inspecting the task queue of a storage system in accordance with exemplary aspects of the present disclosure

Once all of the aforementioned information is determined, the method proceeds to 410, where the scheduler 101 generates a scheduling problem. The scheduling problem is generated based on the state of the current system collected as shown in FIGS. 6-7 along with information regarding the actual data and any other specialized information indicated by the system. The information that can assist in solving the scheduling problem comprises service level agreements (SLAs), human-defined constraints (e.g., the system administrator may have insights on storage functionality), timing constraints, power, hardware vibration, data layout and temperature information.

At 412, the scheduling solution is received by the scheduler 101 from the scheduling engine 108. The operation of the scheduling engine 108 will be detailed in FIG. 5. The solution, e.g., solution 113, is a schedule that efficiently allocates each request to store data on one or more of the storage nodes in a matter consistent with the constraints 1 to k and goals of the system. At 414, the scheduler 101 distributes the requests to each of the workers according to the scheduling solution. The method 400 terminates at 416.

Figure 5:
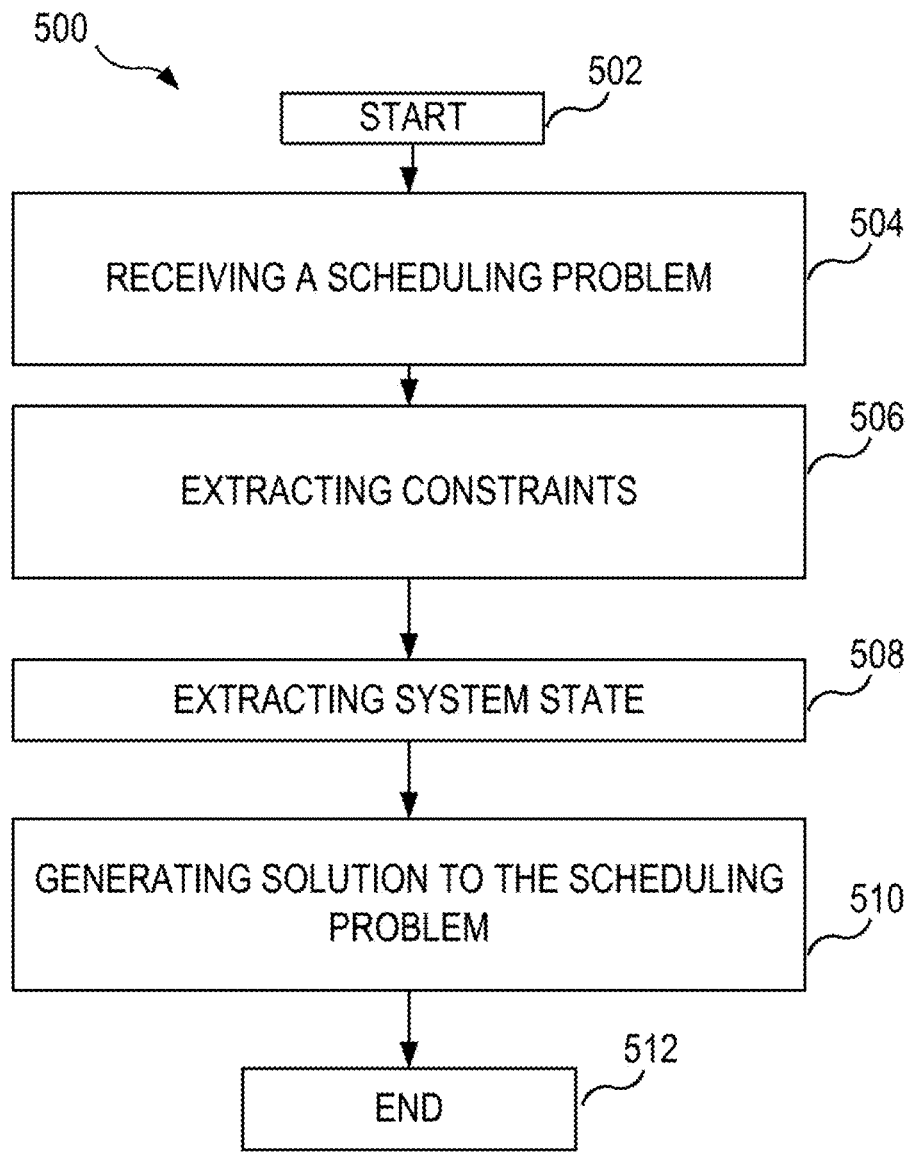
FIG. 5 is a flowchart for a method for scheduling and allocating data storage in accordance with exemplary aspects of the present disclosure.

FIG. 5 is a flowchart for a method 500 for scheduling and allocating data storage in accordance with exemplary aspects of the present disclosure.

The method 500 may be implemented by the scheduling engine 108 and executed by processor 21 of computer system 20 shown in FIG. 8. The method begins at 502 and proceeds to 504.

At 504 the scheduling engine 108 receives the scheduling problem generated by the scheduler 101. As described above, the scheduling problem has a status of a system (e.g., storage system 100, though other systems statuses may be contemplated) and constraints for that system which must or are preferred to be maintained.

The method proceeds to 506, where the constraints are extracted from the scheduling problem. At 508, the state of the system is extracted from the scheduling problem. Finally, at 510, the scheduling engine 108 generates a solution to the problem by solving the "constraints satisfaction problem" by selecting various algorithms that may solve the problem, applying the algorithms to the problem to compute various solutions, and comparing the solutions. In one aspect, the solutions are compared. In this aspect, a solution that is most efficient, comparatively, is selected and applied to the problem 111, and the tasks are distributed accordingly. Alternatively, the scheduling engine 108 may also determine whether the given constraints of the system are satisfied by the solution generated via the approach (algorithm) that was used. If this approach did not produce a solution that satisfies the constraints, another approach will be selected to generate a solution, or generating another solution based on the same approach. In one aspect, each solution is generated by satisfying constraints, and optimizing for (though not necessarily satisfying) an objective function. For example, the scheduling engine 108 could try, as an objective, to minimize time delays for serving client devices. The values of objective functions may be compared, in one aspect, by inspecting and comparing properties between each solution.

In one example, a goal of the system is to reduce power consumption, which can be written as: Power consumption per task=Sum over all devices/resources (e.g., number of storage nodes multiplied by the power consumption of device/resource multiplied by duration of time each device/resource runs} and knowing number of tasks performed over whole day, once can further write:

Day power consumption=sum over tasks {power consumption per task}

Now there are variety of ways to implement (algorithm) storage schedule together with constraints considering each of above mentioned parameter in certain sequence (or priority) and compare their performance (while meeting constraints requirements) and select the best performing algorithm for day. In the long run, the optimized solution might change subject to change in workload or one of the design parameters and proposed scheduling solution will respectively adjust for best solution.

The method terminates at 512.

FIG. 6 is a flowchart for a method 600 for determining a current state of a storage system in accordance with exemplary aspects of the present disclosure.

The method 600 is one implementation of the scheduler 101 as executed by processor 21 of computer system 20 shown in FIG. 8. The method begins at 202 and proceeds to 604. At 604, the scheduler 101 determines whether the workers (e.g. storage nodes) are online, and the number of workers that are online. Additionally, the scheduler 101 may determine other related information regarding the workers such as uptime, power sources and historical usage of the CPU/memory or the like.

At 606, the scheduler 101 inspects the quantity of space available at each worker. In some aspects, the scheduler 101 may inspect the historical quantity of space over a particular period of time to establish a pattern of storage, and take the pattern into consideration. In additional aspects, the scheduler 101 may consider the quality of the worker in terms of historical storage errors and success, in addition to considering and collecting metadata regarding the underlying hard disk drives (or solid state drives) for storage at the worker, contributing to the information that the scheduler 101 may use to form the scheduling problem.

At 610, the scheduler 101 inspects the workload of each worker. In some aspects, this includes current and historical CPU usage, patterns of usage used to align the ultimately formed schedule with historical information about the worker, current and historical storage usage including read and write history for each sector of each of the disk volumes controlled by the worker, and scheduled processes such as scans, local backups, updates and the like.

FIG. 7 is a flowchart for a method 700 for inspecting the task queue of a storage system in accordance with exemplary aspects of the present disclosure.

The method 700 is one implementation of the scheduler 101 as executed by processor 21 of computer system 20 shown in FIG. 8. The method begins at 202 and proceeds to 604.

Inspecting the task queue comprises several sub operations. The method 700 starts at 702 and proceeds to 704.

At 704, the scheduler 101 collects one or more storage requests. In some embodiments, M storage requests are collected, where M is a predetermined value set by an administrator, or adjusted according to an algorithm based on previous operation of the scheduler and the state of the system. In one aspect, M is set to 1000. In another aspect, M may be set to 10,000. In yet other aspects, M is between 200 and 500.

At 706, a data chunk size for each request is inspected. In other words, each request indicates which chunks (e.g., portions) of a file are to be stored and the size of each chunk. In some aspects, several different chunk sizes may be used in the system 100 across each worker. In other aspects, a single chunk size is used across the system 100, and/or each particular worker only accepts, or is only assigned, a particular chunk size or set of chunk sizes.

Additionally, at 708, any additional information associated with each request is determined, for example, service level agreement (SLA) information. The way chunks of data are stored could affect the minimum time to recover a user's data, in the SLA example. For example, if an SLA specifies that a file must be retrievable within a particular minimum recovery time, the scheduler 101 may specify this minimum recovery time in forming the scheduling problem.

At 710, the above information is collected and formed into task queue information, which is used by the scheduler 101 to form the scheduling problem as described in FIG. 4.

The method terminates at 712.

Finally, FIG. 8 illustrates an example of a general-purpose computer system (which may be a personal computer or a server) on which the disclosed systems and method can be implemented according to an example aspect. It should be appreciated that the detailed general-purpose computer system can correspond to the portions of the system 100 described above with respect to FIG. 1. Moreover, the remote computer(s) 49, as described below, can correspond to the remote data storage services discussed above with respect to the exemplary system and method.

As shown in FIG. 8, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for scheduling and allocating data storage tasks in a plurality of storage nodes, comprising:
    determining a plurality of storage tasks for performing a storage request, wherein the plurality of storage tasks are to be assigned to the plurality of storage nodes;
    identifying constraints of the plurality of storage nodes;
    generating, by a processor, a scheduling problem based at least on states of each of the plurality of storage nodes, the plurality of storage tasks, and the constraints, wherein the scheduling problem is a constraint satisfaction problem;
    selecting one or more approaches to solving the scheduling problem based on metadata associated with the storage tasks and the constraints;
    generating a scheduling solution based on the one or more approaches;
    determining whether the scheduling solution comprises an assignment schedule wherein at least a predetermined threshold percentage of the constraints of the plurality of storage nodes are satisfied by the scheduling solution;
    executing, by the processor, the scheduling solution by assigning storage tasks of the plurality of storage tasks to each of the plurality of storage nodes when the scheduling solution comprises the assignment schedule; and
    determining another scheduling solution based on the one or more approaches when the scheduling solution does not comprise the assignment schedule.

2. The method of claim 1, wherein generating the scheduling solution is performed using one or more of an integer programming problem, Boolean satisfiability problem or specific scheduling heuristics.

3. The method of claim 1, further comprising optimizing the scheduling solution such that the scheduling solution 1) is optimized for a given objective or objectives and 2) satisfies all of the constraints.

4. The method of claim 3, wherein the given objectives or objectives include one or more of:
   minimal power used by a storage node;
   no nodes were turned on from stand-by mode; and
   specific data-durable distribution was used.

5. The method of claim 1, further comprising:
   determining the states of each of the plurality of storage nodes by:
      determining which of the plurality of storage nodes are currently online;
      determining storage space available in each of the plurality of storage nodes; and
      determining a workload of each of the plurality of storage nodes.

6. The method of claim 5, further comprising:
   inspecting a data size for each of the plurality of storage tasks; and
   determining additional information for each of the plurality of storage tasks.

7. The method of claim 1, wherein the metadata associated with the plurality of storage tasks and the constraints comprises at least one or more of current file location, data size, access and operation (edit, create, scheduled deletion) dates, number of copies, and copy locations.

8. The method of claim 1, wherein generating the scheduling solution comprises using machine learning and heuristics to generate the scheduling solution.

9. The method of claim 1, further comprising:
   generating an alternate scheduling solution based on the one or more approaches;
   comparing respective efficiencies of the scheduling solution and the alternate scheduling solution;
   selecting the alternate scheduling solution responsive to determining that the alternate scheduling solution is comparatively most efficient; and
   applying the alternate scheduling solution to the scheduling problem by assigning the plurality of storage tasks according to the alternate scheduling solution.

10. The method of claim 1, wherein the constraints describe prohibited and/or discouraged states of the plurality of storage nodes.

11. The method of claim 10, wherein the constraints define a maximum allowed power, a maximum number of nodes allowed online, or a restriction on which nodes can serve the storage request.

12. The method of claim 1, wherein chunks belonging to a same data file associated with a storage task of the plurality of storage tasks are stored in different storage nodes.

13. A system for scheduling and allocating data storage tasks in a plurality of storage nodes, the system comprising:
   a hardware processor configured to:
      determine a plurality of storage tasks for performing a storage request, wherein the plurality of storage tasks are to be assigned to the plurality of storage nodes;
      identify constraints of the plurality of storage nodes;
      generate a scheduling problem based at least on states of each of the plurality of storage nodes, the plurality of storage tasks, and the constraints, wherein the scheduling problem is a constraint satisfaction problem;
      select one or more approaches to solving the scheduling problem based on metadata associated with the storage tasks and the constraints;
      generate a scheduling solution based on the one or more approaches;
      determine whether the scheduling solution comprises an assignment schedule wherein at least a predetermined threshold percentage of the constraints of the plurality of storage nodes are satisfied by the scheduling solution;
      executing, by the processor, the scheduling solution by assigning storage tasks of the plurality of storage tasks to each of the plurality of storage nodes when the scheduling solution comprises the assignment schedule; and
      determine another scheduling solution based on the one or more approaches when the scheduling solution does not comprise the assignment schedule.

14. The system of claim 13, wherein generating the scheduling solution is performed using one or more of an integer programming problem, Boolean satisfiability problem or specific scheduling heuristics.

15. The system of claim 13, wherein the hardware processor is further configured to optimize the scheduling solution such that the scheduling solution 1) is optimized for a given objective or objectives and 2) satisfies all of the constraints.

16. The system of claim 15, wherein the given objectives or objectives include one or more of:
   minimal power used by a storage node;
   no nodes were turned on from stand-by mode; and
   specific data-durable distribution was used.

17. The system of claim 13, the hardware processor further configured to:
   determine the states of each of the plurality of storage nodes by:
      determining which of the plurality of storage nodes are currently online;
      determining storage space available in each of the plurality of storage nodes; and
      determining a workload of each of the plurality of storage nodes.

18. A non-transitory computer-readable medium storing therein computer-executable instructions, the instructions comprising:
   determining a plurality of storage tasks for performing a storage request, wherein the plurality of storage tasks are to be assigned to a plurality of storage nodes;
   identifying constraints of the plurality of storage nodes;
   generating, by a processor, a scheduling problem based at least on states of each of the plurality of storage nodes, the plurality of storage tasks, and the constraints, wherein the scheduling problem is a constraint satisfaction problem;
   selecting one or more approaches to solving the scheduling problem based on metadata associated with the storage tasks and the constraints;
   generating a scheduling solution based on the one or more approaches;
   determining whether the scheduling solution comprises an assignment schedule wherein at least a predetermined threshold percentage of the constraints of the plurality of storage nodes are satisfied by the scheduling solution;

executing, by the processor, the scheduling solution by assigning storage tasks of the plurality of storage tasks to each of the plurality of storage nodes when the scheduling solution comprises the assignment schedule; and determining another scheduling solution based on the one or more approaches when the scheduling solution does not comprise the assignment schedule.

\* \* \* \* \*